US 8,000,657 B2

(12) United States Patent
Do et al.

(10) Patent No.: US 8,000,657 B2
(45) Date of Patent: Aug. 16, 2011

(54) METHOD AND SYSTEM FOR RELAYING DATA IN A MOBILE COMMUNICATION SYSTEM

(75) Inventors: Mi-sun Do, Suwon-si (KR); Eunhyun Kwon, Seoul (KR); Yongsuk Park, Seoul (KR); Jaiyong Lee, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 1009 days.

(21) Appl. No.: 11/812,519

(22) Filed: Jun. 19, 2007

(65) Prior Publication Data

US 2008/0009241 A1  Jan. 10, 2008

(30) Foreign Application Priority Data

Jun. 20, 2006  (KR) .................. 10-2006-0055528

(51) Int. Cl.
*H04B 17/00* (2006.01)
(52) U.S. Cl. .................. 455/67.13; 455/67.11; 455/63.1; 455/450; 455/452.2; 455/11.1; 455/13.1; 455/442; 370/335; 370/338; 370/315; 370/293; 370/279; 375/211
(58) Field of Classification Search ............... 455/7, 442, 455/445, 67.11, 67.13, 450, 452.2, 63.1, 455/13.1, 70, 11.1; 370/238, 342, 315, 317, 370/335, 338, 293, 279; 375/211–212
See application file for complete search history.

(56) References Cited

U.S. PATENT DOCUMENTS

| 7,184,703 | B1 * | 2/2007 | Naden et al. ............... 455/10 |
| 7,352,729 | B2 * | 4/2008 | Fujiwara et al. ........... 370/338 |
| 7,386,036 | B2 * | 6/2008 | Pasanen et al. ........... 375/211 |
| 7,545,765 | B2 * | 6/2009 | Larsson et al. ........... 370/328 |
| 7,555,035 | B2 * | 6/2009 | Shi et al. .................. 375/211 |
| 7,599,341 | B2 * | 10/2009 | Ramachandran .......... 370/338 |
| 7,619,998 | B2 * | 11/2009 | Takeda et al. ............ 370/312 |
| 7,643,793 | B2 * | 1/2010 | Park et al. ................ 455/16 |
| 7,769,399 | B2 * | 8/2010 | Lee et al. ................. 455/466 |
| 2003/0125067 | A1 * | 7/2003 | Takeda et al. ........... 455/522 |
| 2004/0266339 | A1 * | 12/2004 | Larsson .................... 455/7 |
| 2005/0014464 | A1 * | 1/2005 | Larsson ................... 455/11.1 |

* cited by examiner

Primary Examiner — Marceau Milord
(74) Attorney, Agent, or Firm — NSIP Law

(57) ABSTRACT

A method and system for relaying data in a mobile communication system are provided, in which a Relay Station (RS) configures a routing table using Link Quality Information (LQI) exchanged among Relay Stations (RSs) in a cell, determines a relay path referring to the routing table, measures the quality of a signal received from an Mobile Station (MS), determines whether to relay data received from the MS by comparing the measured signal quality with at least one of information regarding a data rate of the MS and a reference threshold, transmits a relay request message to a Base Station (BS), if the RS determines to relay the data received from the MS, updates the relay path, upon receipt of a relay response message accepting the relay request and broadcasting information from the BS, and relays the data received from the MS to the BS in the updated relay path.

33 Claims, 6 Drawing Sheets

METHOD AND SYSTEM FOR RELAYING DATA IN A MOBILE COMMUNICATION SYSTEM

CROSS-REFERENCE TO RELATED PATENT APPLICATION

This application claims the benefit under 35 U.S.C. §119 (a) of a Korean Patent Application filed in the Korean Intellectual Property Office on Jun. 20, 2006 and assigned Ser. No. 2006-55528, the entire disclosure of which is hereby incorporated by reference.

BACKGROUND OF THE INVENTION

1. Field of the Invention

The present invention generally relates to a method and system for relaying data in a mobile communication system. More particularly, the present invention relates to a method and system for relaying data received from a Mobile Station (MS) in a mobile communication system.

2. Description of the Related Art

Generally, a mobile communication system includes a Base Station (BS), a plurality of Relay Stations (RSs), and a plurality of MSs. The mobility of the MSs is ensured and the MSs transmit data to the BS directly or via a neighbor RS. Data transmission/reception to/from a destination via an intermediate node is called relaying.

For relaying data, the BS and the RS should have knowledge of information specific to nodes (the BS, the RSs, and the MSs) within a cell, hop paths, and an optimal path. This relay service expands service coverage as well as increases system capacity. Because data transmission/reception is enabled even between the BS and an MS outside the cell area, the relay service expands the service area of the BS.

However, there is no specified method for detecting paths between nodes and selecting an optimal path between the BS and MS in the conventional mobile communication system.

Accordingly, there is a need for an improved method and system for relaying data in a mobile communication system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and system for relaying data in a mobile communication system.

Another aspect of exemplary embodiments of the present invention is to provide a routing optimization method of a BS in a mobile communication system.

A further aspect of exemplary embodiments of the present invention is to provide a data relaying method of an RS in a mobile communication system.

In accordance with an aspect of exemplary embodiments of the present invention, there is provided a mobile communication system in which an RS measures the quality of a signal received from an MS, determines whether to relay data received from the MS by comparing the measured signal quality with at least one of information about a data rate of the MS and a predetermined threshold, and transmits a relay request message to a BS when the RS determines to relay the data received from the MS. The BS determines whether to accept the relay request, upon receipt of the relay request message from the RS and transmits a relay response message and broadcasting information to the RS according to the determination.

In accordance with another aspect of exemplary embodiments of the present invention, there is provided a method for relaying data in a mobile communication system, in which an RS measures the quality of a signal received from an MS, determines whether to relay data received from the MS by comparing the measured signal quality with at least one of information about a data rate of the MS and a predetermined threshold, and transmits a relay request message to a BS. If the RS determines to relay the data received from the MS, the BS determines whether to accept the relay request and transmitting a relay response message and broadcasts information to the RS according to the determination. The RS updates a stored relay path using the broadcasting information and relays the data received from the MS to the BS in the updated relay path.

In accordance with a further aspect of exemplary embodiments of the present invention, there is provided a relay method of an RS in a mobile communication system, in which the RS measures the quality of a signal received from an MS and determines whether to relay data received from the MS according to the measured signal quality.

In accordance with still another aspect of exemplary embodiments of the present invention, there is provided a relay method of an RS in a mobile communication system. The RS configures a routing table using LQI exchanged among RSs in a cell, determines a relay path referring to the routing table, measures the quality of a signal received from an MS, determines whether to relay data received from the MS by comparing at least one of information about the measured signal quality a data rate of the MS and a predetermined threshold, transmits a relay request message to a BS when the RS determines to relay the data received from the MS, updates the relay path, relaying the data received from the MS to the BS using the updated relay path when the MS receives a relay response message accepting the relay request and broadcasting information from the BS.

In accordance with yet another aspect of exemplary embodiments of the present invention, there is provided a relay method of a BS in a system, in which the BS broadcasts broadcasting information, determines whether to accept the relay request, upon receipt of a relay request message from an RS, transmits a relay response message including an acceptance for the relay request when the BS accepts the relay request, changes the broadcasting information, and broadcasts the changed broadcasting information.

In accordance with yet a further aspect of exemplary embodiments of the present invention, there is provided a method for optimizing routing in a mobile communication system, in which LQI is exchanged among nodes within a cell, a routing table is configured with using the exchanged LQI, the qualities of bi-directional channels between every pair of nodes are measured, and routing is optimized between the every pair of nodes.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and system for relaying data in a multi-hop communication system. The exemplary embodiments of the present invention especially provide a data relaying method and system in which an RS determines whether to relay data received from an MS in a mobile communication system. The data relaying method and system according to exemplary embodiments of the present invention are applicable to both the downlink and the uplink. While exemplary embodiments of the present invention are described in the context of a system using a single RS, it is clearly to be understood that exemplary embodiments of the present invention are also applicable to a system with a plurality of RSs.

Terms used herein will first be defined as follows.

Base Station (BS): Equipment that routes data directed to a plurality of MSs within a cell or transmits data received from the MSs to destinations. For the data transmission/reception, the BS broadcasts system parameters periodically and configures and updates a routing table using information received from the MSs.

Relay Station (RS): Equipment that enables reliable data transmission/reception between a BS and an MS. Accordingly, an RS can be installed in an area with low signal strength or a shadow area. A plurality of RSs can be provided within a cell.

Mobile Station (MS): Mobility is ensured for the MS. The MS provides a wide range of services to a user under the control of a BS.

Uplink Channel: A channel that delivers data from an MS to a BS. An uplink channel is allocated to each MS so that the MS can transmit data on the allocated uplink channel.

Downlink Channel: A channel that delivers data from a BS to an MS.

A description will be made below of a data relaying method and system in a mobile communication system according to an exemplary embodiment of the present invention, followed by a description of relaying methods in a BS and an RS and a routing optimization method in the mobile communication system.

Figure 1:
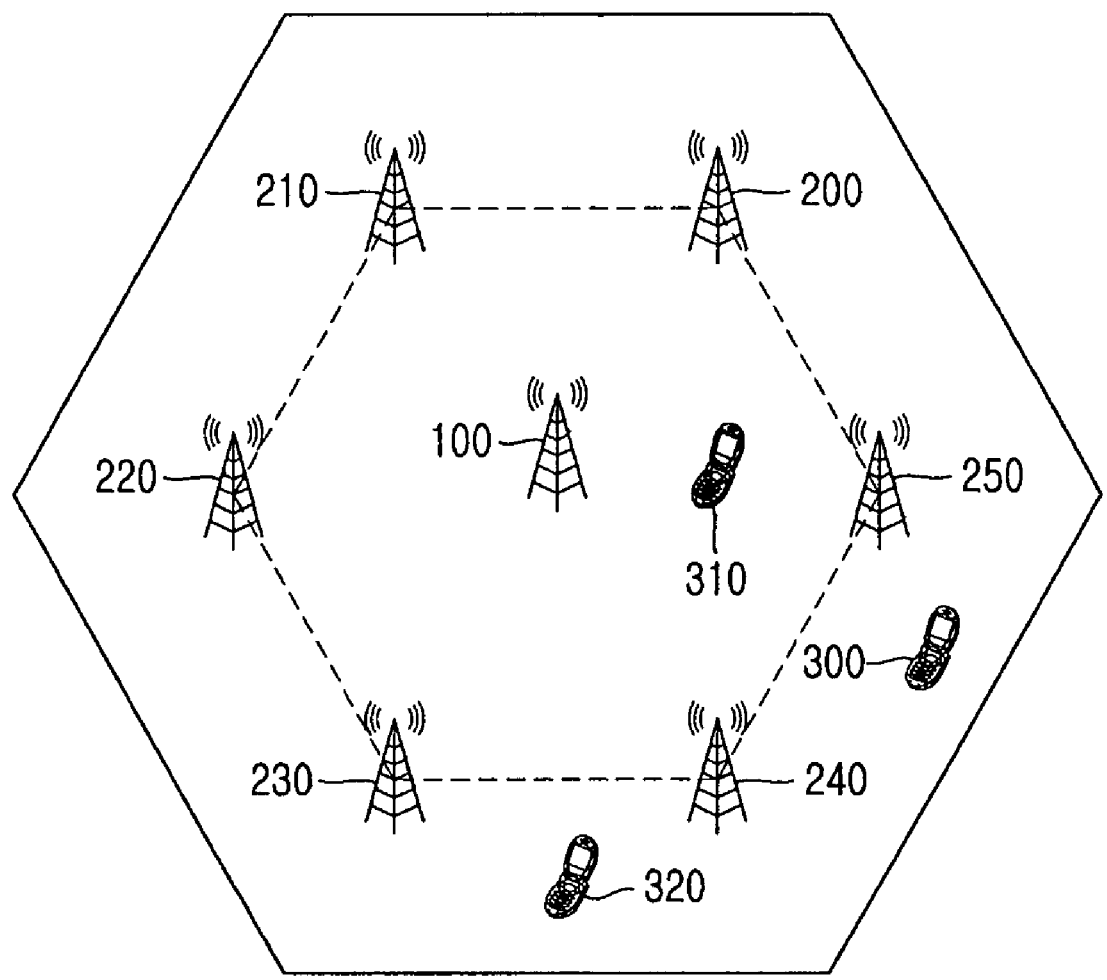
FIG. 1 illustrates a configuration of a mobile communication system according to an exemplary embodiment of the present invention.

FIG. 1 illustrates the configuration of a mobile communication system according to an exemplary embodiment of the present invention.

Referring to FIG. 1, the mobile communication system includes a BS 100, a plurality of RSs 200 to 250 for relaying data or signals received from the BS 100 and relaying received data or signals to the BS 100, and a plurality of MSs 300 to 320 located within the radiuses of the BS 100 or the RSs 200 to 250, for transmitting/receiving data to/from the BS 100 or the RSs 200 to 250.

The BS 100 controls data transmission/reception to/from the RSs 200 to 250 and the MSs 300 to 320. Accordingly, the BS 100 periodically creates and updates routing paths for the MSs 300 to 320 and detects (or determines) an optimal path from among the routing paths. In order to periodically update the routing paths, the BS 100 broadcasts broadcasting information such as an Uplink Channel Descriptor (UCD) message and an Uplink MAP (UL-MAP) message for periodically updating the routing paths.

The BS selects an optimal path using signals directly received from the MSs or via the RSs. The optimal path selection is performed based on the channel quality of the downlink/uplink between nodes connected by wire/wireless. The BS transmits data to the MSs directly or via the RSs in the optimal path. To transmit/receive data to/from a destination, the BS broadcasts broadcasting information to the RSs and the MSs within the cell.

A plurality of RSs can be provided in a cell, especially at an area with a low received signal strength of a signal broadcast from the BS or in a shadow area. Such an RS reliably relays signals between the BS and an MS and in addition, amplifies data between the BS and the MS. For the reliable data relay, the RS monitors the channel status between the BS and the MS and the mobility of the MS periodically or when needed using signals received from the BS and the MS. The signals include the UCD and the UL-MAP messages from the BS and an uplink Protocol Data Unit (PDU) from the MS.

The RS acquires Uplink Interval Usage Codes (UIUCs) identifying burst profiles from the UCD message and information about user data areas of MSs from the UL-MAP message. Also, the RS acquires Uplink Channel Quality Information (UCQI) from a pilot signal and/or an uplink PDU received from the MS. The UCQI can be Received Signal Strength Indicator (RSSI), Carrier-to-Interference and Noise Ratio (CINR), or the like. The RS decides as to whether a gain can be achieved by relaying data based on the UCQI and the data rate of the MS.

Mobility is ensured to the MS within the cell and a variety of services are provided to the MS.

An exemplary embodiment of the present invention provides a method for transmitting and receiving data between an MS and a BS directly or via an RS according to the current location of the MS. One thing to note is that the RS is responsible for selecting an optimal path in the data transmission/reception.

Figure 2:
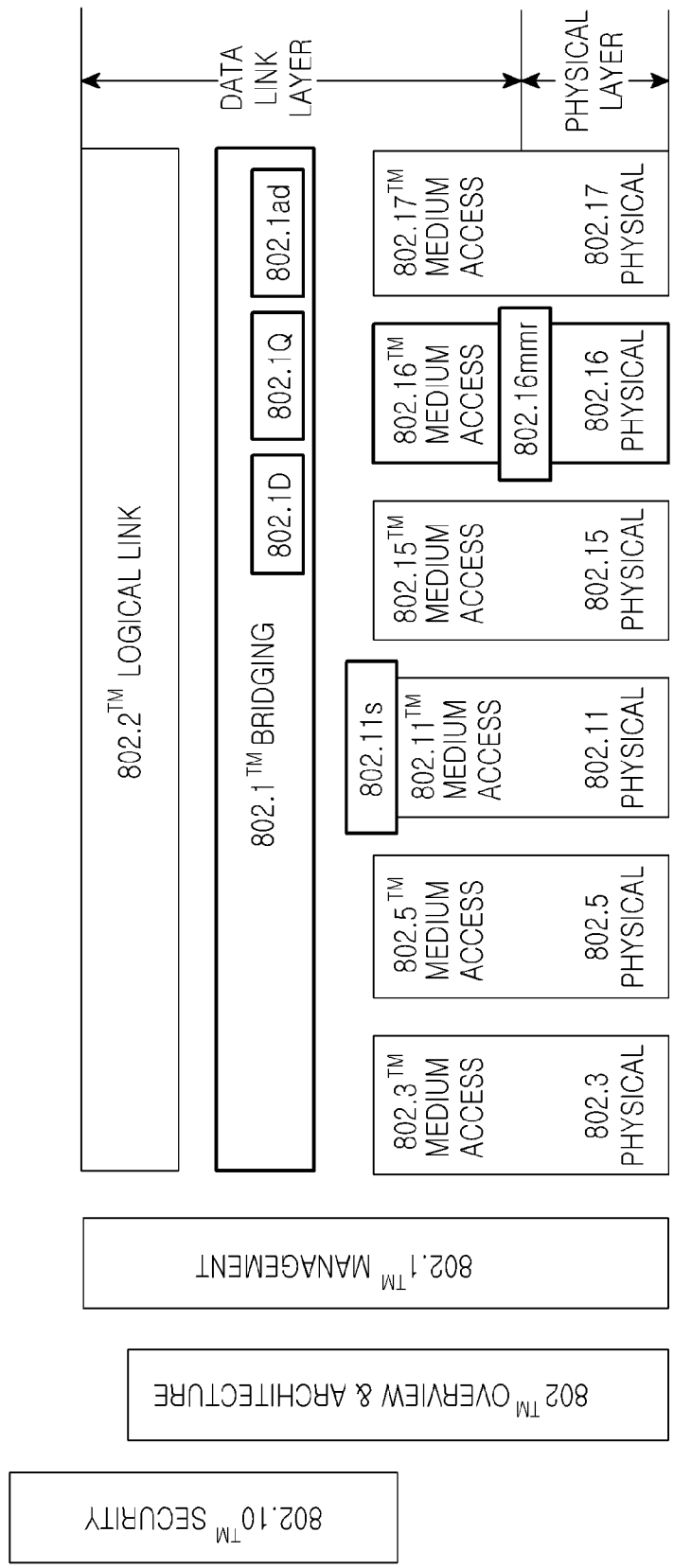
FIG. 2 is a module block diagram of a BS or an RS according to an exemplary embodiment of the present invention.

FIG. 2 is a module block diagram of the BS or the RS according to an exemplary embodiment of the present invention.

Referring to FIG. 2, the BS or the RS includes a physical layer and a data link layer. The physical layer is provided with different protocol modules (e.g. 802.3, 802.5, 802.11, 802.15, 802.16, 802.16 mmr and 802.17) for media access and performs signal amplification, forwarding and decoding. The data link layer has 802.1D, 802.1Q and 802.1ad protocols.

Each BS decodes a Media Access Control (MAC) frame in the data link layer and forwards the decoded MAC frame to an upper layer.

Figure 3:
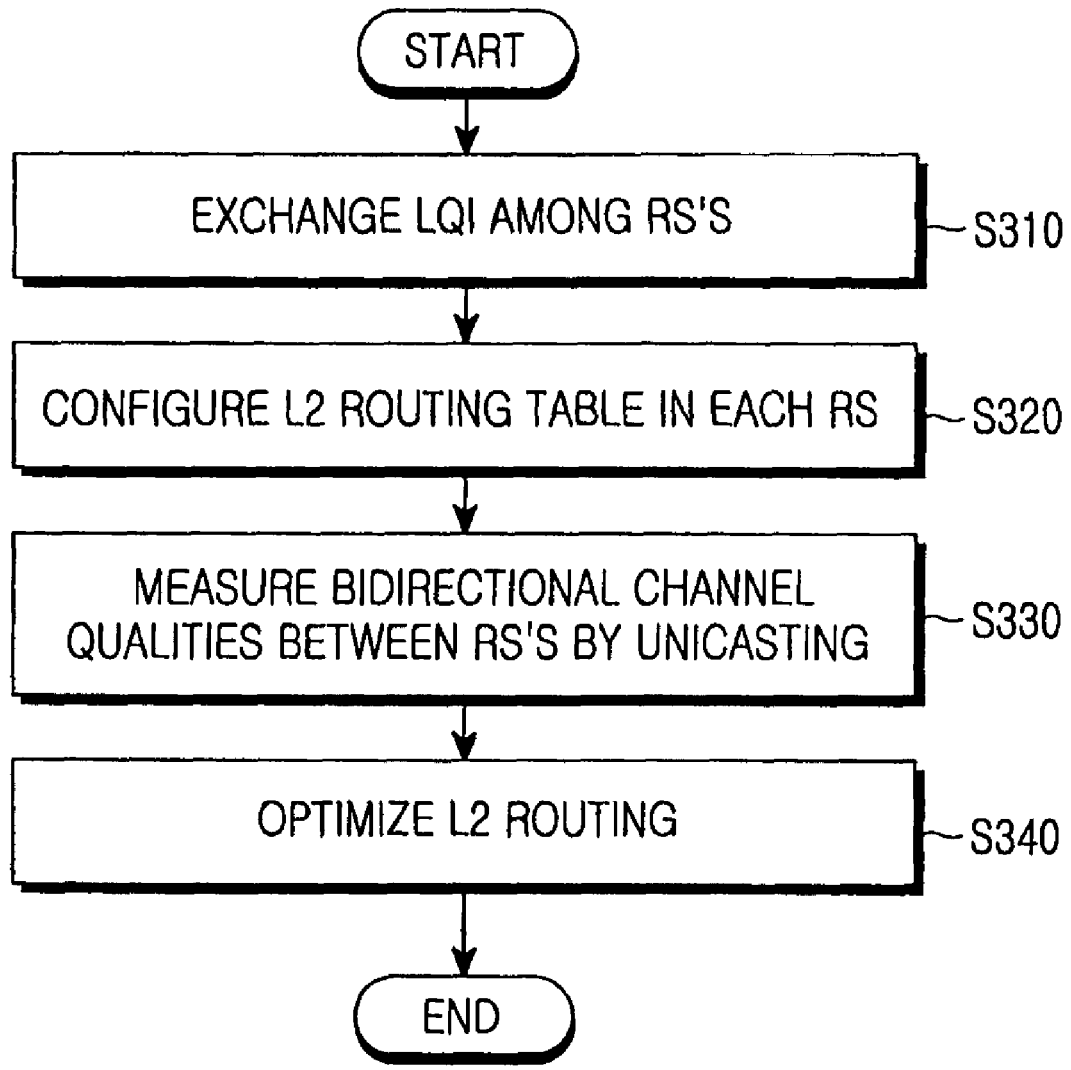
FIG. 3 is a flowchart illustrating a Layer 2 (L2) routing optimization method according to an exemplary embodiment of the present invention.

FIG. 3 is a flowchart illustrating an L2 routing optimization method according to an exemplary embodiment of the present invention. Routing among nodes (a BS, RSs, and MSs) must precede relaying in the system according to an exemplary embodiment of the present invention. A method for optimizing the routing is illustrated in FIG. 3.

Referring to FIG. 3, RSs exchange Link Quality Information (LQI) with one another by broadcasting the LQI in step S310. The LQI of each RS contains path information and hop cost information between the RS and a BS and/or between the RS and another RS. Thus, this LQI provides multi-hop link quality information and the multi-hop link quality information includes the number of hops and the current channel quality of each hop acquired from burst profiles such as Downlink Interval Usage Codes (DIUCs) and UIUCs. The DIUCs and the UIUCs identify burst profiles that specify modulation, coding, and error correction schemes.

In step S320, each RS configures(or makes) an L2 routing table using the LQI. That is, each of the BS and the RSs configures an L2 routing table in a tree structure with the BS on top using the LQI information received from the BS and/or the other RSs. The tree-structured L2 routing table includes the IDs of nodes and the LQI between nodes.

The RS measures the qualities of bi-directional channels between the RS and another RS by unicasting in step S330. The bidirectional channels are a reception channel and a transmission channel. The quality of the reception channel can be evaluated by measuring the signal strength of a pilot signal received from the BS or a MAC PDU received from another RS. The quality of the transmission channel is detected from a Channel Report Response (REP-RSP) message received from the BS or another RS in response to a transmitted Channel Report Request (REP-REQ) message.

In step S340, each RS or the BS optimizes L2 routing. This routing optimization is optimization between the BS and RSs or between an RS and another RS. Data rates can be calculated from DIUCs and UIUCs, referring to a DCD and a UCD. MAC-layer relaying can be carried out using the routing table made in step S320 or by the optimized routing technique of step S340 according to an exemplary embodiment of the present invention.

Figure 4:
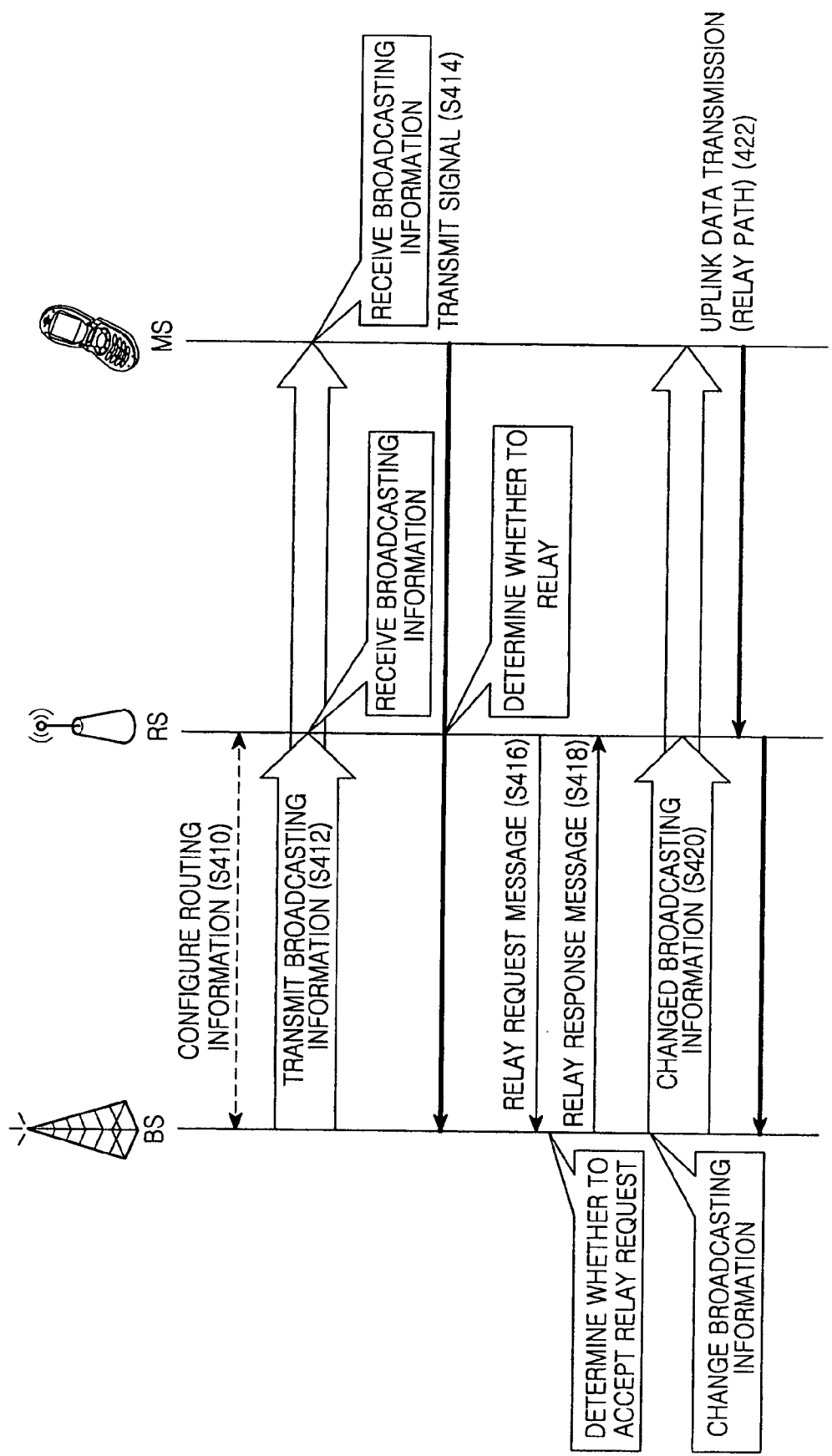
FIG. 4 is a diagram illustrating a signal flow for a data relaying method in the mobile communication system according to an exemplary embodiment of the present invention.

FIG. 4 is a diagram illustrating a signal flow for a data relaying method in the mobile communication system according to an exemplary embodiment of the present invention.

Referring to FIG. 4, upon receipt of LQI broadcast by RSs, a BS configures a routing table in step S410. The operation of configuring the routing table in the BS will now be detailed. Every RS broadcasts LQI in the multi-hop communication system. The LQI includes path information and hop information between the RS and the BS and between the RS and other RSs. The hop information indicates the numbers of hops by which the RS is linked to other RSs and the path information indicates the current status of each hop link. The BS and every RS configures a routing table with routing information needed for data relaying. Paths are established between the BS and the RSs, taking into account channel quality using the routing information. The BS broadcasts broadcasting information by DL-MAP, UL-MAP, UCD, and DCD messages in step S412. The routing information is included in one of these messages.

The RS and an MS receive the broadcasting information from the BS and acquire information about uplink resources allocated to the MS from the UL-MAP and UCD messages.

The MS transmits an uplink signal to the BS according to the uplink resource information in step S414. The uplink signal includes a reference signal, for example, a pilot signal.

Meanwhile, the RS receives the uplink signal from the MS according to the uplink resource information and measures the quality of the uplink signal. The uplink signal quality includes CINR regarding the uplink or a channel through the signal, for example.

The RS compares the CINR of the uplink signal with a predetermined threshold. If the CINR is equal to or greater than the threshold, the RS determines to relay uplink signals to the BS. The threshold is variably adjusted. It is commonly equal to all RSs within the cell or different to the individual RSs.

While deciding on relaying the uplink signal to the BS, the RS transmits a relay request message requesting relay acceptance to the BS in step S416. The relay request message includes the Identifier (ID) of the RS, the ID of the MS, a UIUC, or a DIUC.

The BS determines whether to accept the relay request, taking into account the uplink channel status between the BS and the MS and the loads of the BS and the RS. If the BS accepts the relay request, it replies to the RS with a relay response message indicating acceptance of the relay request in step S418. The relay response message includes the ID of the RS, the ID of the MS, and the UIUC or the DIUC set in the relay request message.

In step S420, the BS changes the broadcasting information so that the RS can relay the uplink signals to the BS. The changed broadcasting information contains uplink resource allocation information to support transmission of uplink signals from the MS to the BS via the RS. The BS then broadcasts the changed broadcasting information in step S420. The RS and the MS detect the uplink resource allocation information from the broadcasting information and are aware that the RS should relay uplink signals from the MS to the BS. Therefore, the MS transmits an uplink signal to the RS and the RS relays the uplink signal to the BS in step S422.

Figure 5:
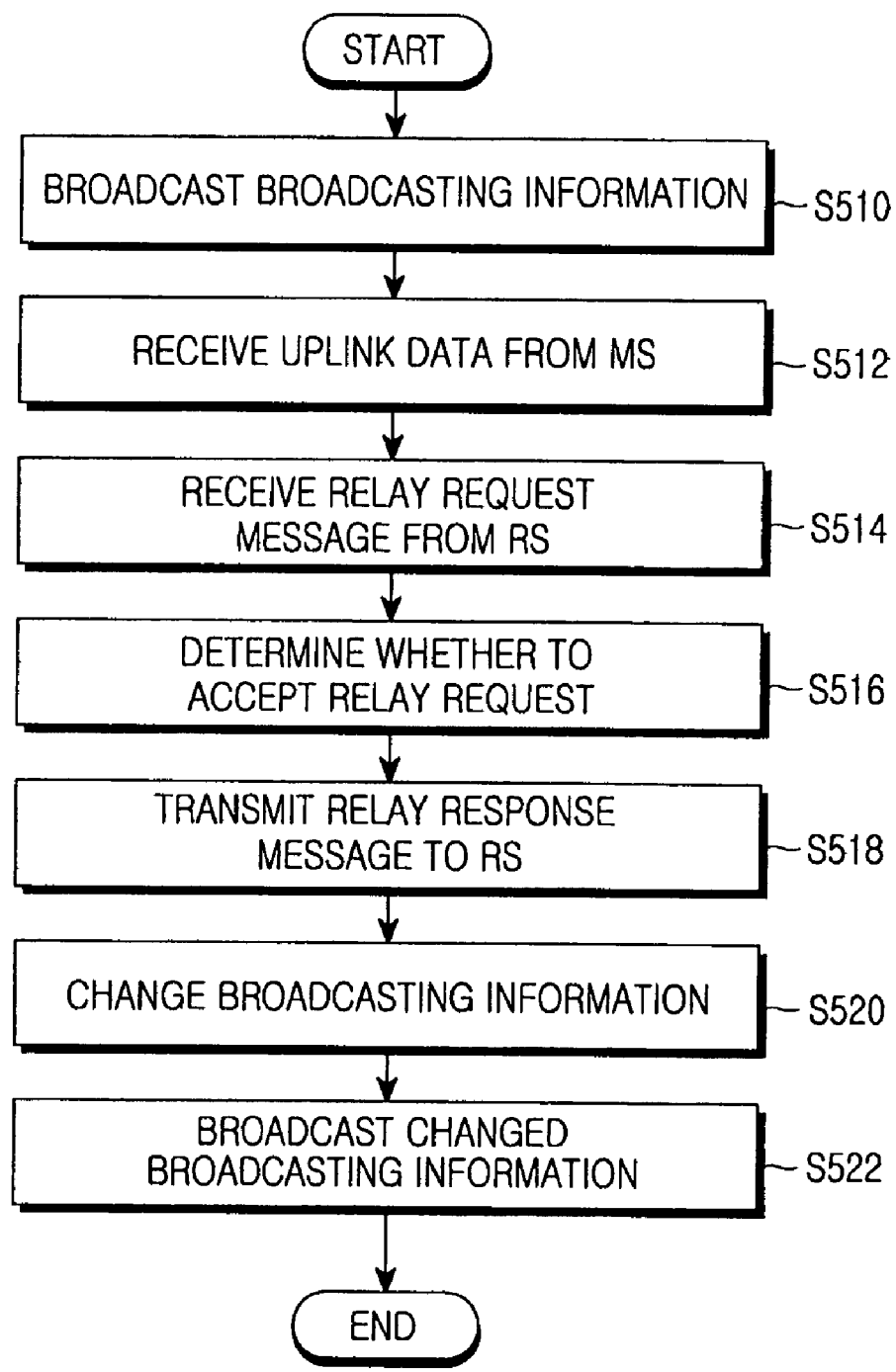
FIG. 5 is a flowchart illustrating a relaying method in the BS according to an exemplary embodiment of the present invention.

FIG. 5 is a flowchart illustrating a relaying method in the BS according to an exemplary embodiment of the present invention.

Referring to FIG. 5, the BS broadcasts broadcasting information to all RSs and all MSs in the cell in step S510. The broadcasting information is included in DL-MAP, UL-MAP, DCD and UCD messages. Routing information is included in one of these messages. Upon receipt of the broadcasting information, every RS and every MS acquire information about uplink resources allocated to the MSs from the UL-MAP and UCD messages.

The MS transmits an uplink signal according to the uplink resource information and the BS receives the uplink signal in step S512. The uplink signal is a reference signal such as a pilot signal. An RS between the MS and the BS also receives the uplink signal directed from the MS to the BS. The BS receives a relay request message from the RS in step S514 and decides as to whether to accept the RS's relay request in accordance with the uplink channel status between the BS and the MS, the signal qualities of the BS and the MS, and the loads of the BS and the RS in step S516.

If the BS accepts the relay request, it replies to the RS with a relay response message indicating the acceptance in step S518. On the other hand, if the BS rejects the relay request, the BS replies to the RS with a relay response message indicating the rejection. In the illustrated case of FIG. 5, the BS accepts the relay request. The BS then changes the broadcasting information in step S520 and broadcasts the changed broadcasting information in step S522.

Figure 6:
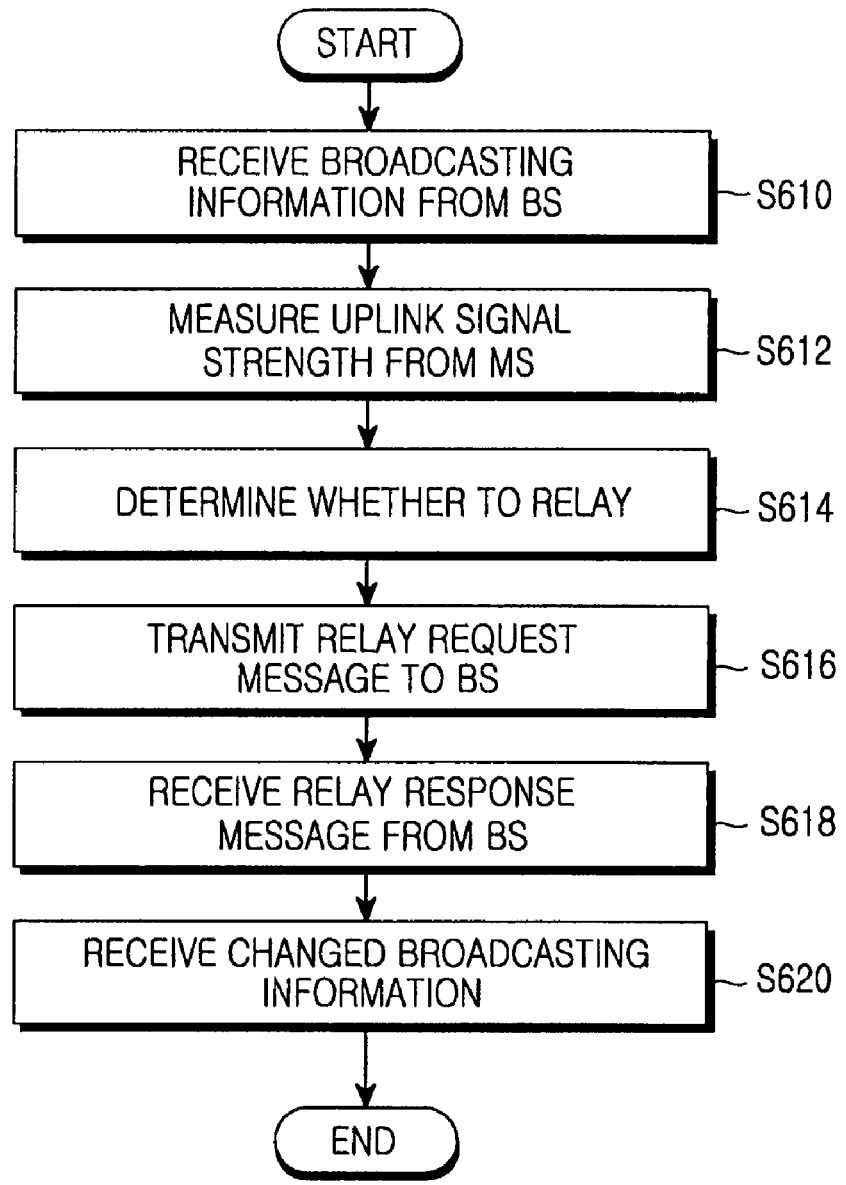
FIG. 6 is a flowchart illustrating a relaying method in the RS according to an exemplary embodiment of the present invention.

FIG. 6 is a flowchart illustrating a relaying method in the RS according to an exemplary embodiment of the present invention.

Referring to FIG. 6, the RS receives broadcasting information from a BS and a pilot signal and/or a user PDU from an MS in step S610. The RS acquires UIUCs identifying burst profiles from a UCD received from the BS and information about user data areas from a UL-MAP received from the BS. The RS also acquires UCQI from the pilot signal and/or the uplink PDU from the MS. The UCQI is measured in terms of RSSI or CINR. The RS decides as to whether a gain can be achieved by relaying based on the UCQI and information about the data rate of the MS. In step S612, the RS measures the uplink signal quality (for example, RSSI or CINR) using the broadcasting information. The RS compares the uplink signal quality with a predetermined threshold and determines whether to relay an uplink signal from the MS to the BS in step S614. If the CINR of the uplink signal is equal to or greater than the threshold, the RS decides to relay. Then the RS transmits a relay request message to the BS in step S616. The relay request message includes the ID of the RS, the Connection ID (CID) of the MS, and a UIUC and a DIUC to be used for relaying. Upon receipt of a relay response message from the BS in step S618 and changed broadcasting information from the BS in step S620, the RS relays uplink signals received from the MS to the BS. For example, the RS updates a relay path using the changed broadcasting information and relays the uplink signals in the updated relay path.

A plurality of relay request/response messages can be transceived at one time according to a predetermined time period.

In this manner, the RS can determine whether another RS provides a relay service to the MS. The relay request message and the relay response message can be broadcast or unicast and another RS may overhear the relay request message and the relay response message. The RS can use information about an MS to which another RS provides a relay service in deciding on its relaying service.

As described above, exemplary embodiments of the present invention provide a signal relay method among a BS, an RS and an MS in a multi-hop communication system. Therefore, system capacity is increased and service coverage is expanded. Also, since the RS is responsible for deciding whether to relay uplink data from the MS to the BS, transmission/reception of control messages for the uplink data relay is minimized.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A relay method of a Relay Station (RS) in a mobile communication system, the method comprising:
   measuring a quality of a signal received from a Mobile Station (MS); and
   determining whether to relay data received from the MS according to the measured signal quality,
   wherein the determining of whether to relay data includes comparing the measured signal quality with a reference threshold and relaying the data received from the MS to the BS in a relay path, upon receipt of a relay response message from the BS.

2. The relay method of claim 1, wherein the determining of whether to relay data comprises:
   transmitting a relay request message to a Base Station (BS), when the signal quality is at least one of equal to and greater than the threshold.

3. The relay method of claim 2, wherein the relay request message includes at least one of an Identifier (ID) of the RS, an ID of the MS, an Uplink Interval Usage Code (UIUC) and a Downlink Interval Usage Code (DIUC).

4. The relay method of claim 2, wherein the relay response message includes at least one of an ID of the RS, an ID of the MS, a UIUC, a DIUC and a response for the relay request message.

5. The relay method of claim 1, further comprising:
   configuring a routing table using Link Quality Information (LQI) exchanged among RSs in a cell; and
   determining the relay path using the routing table.

6. The relay method of claim 1, wherein the signal quality comprises at least one of Uplink Channel Quality Information (UCQI) acquired from a pilot signal and an uplink Protocol Data Unit (PDU) of the MS.

7. The relay method of claim 6, wherein the RS determines whether to relay the data received from the MS according to the UCQI and a data rate of the MS.

8. The relay method of claim 1, wherein the threshold is adjustable and comprises at least one of a common value for all RSs and a different value for each of the RSs in a cell.

9. A relay method of a Relay Station (RS) in a mobile communication system, the method comprising:
   configuring a routing table using Link Quality Information exchanged among RSs in a cell and determining a relay path referring to the routing table;
   measuring a quality of a signal received from a Mobile Station (MS);
   determining whether to relay data received from the MS by comparing at least one of information regarding the measured signal quality, a data rate of the MS and a reference threshold;
   transmitting a relay request message to a Base Station (BS), when the RS determines to relay the data received from the MS; and
   updating the relay path, relaying the data received from the MS to the BS using the updated relay path when the MS receives a relay response message accepting the relay request and broadcasting information from the BS.

10. The relay method of claim 9, wherein the received signal includes at least one of a pilot signal and an uplink Protocol Data Unit (PDU).

11. The relay method of claim 9, wherein the relay request message includes at least one of an Identifier (ID) of the RS, an ID of the MS, an Uplink Interval Usage Code (UIUC) and a Downlink Interval Usage Code (DIUC).

12. The relay method of claim 9, wherein the relay response message includes at least one of an ID of the RS, an ID of the MS, a UIUC, a DIUC and a response for the relay request message.

13. The relay method of claim 9, wherein the measuring of the signal quality comprises:
   extracting Uplink Channel Quality Information (UCQI) regarding the MS; and
   measuring at least one of a Carrier-to-Interference and Noise Ratio (CINR), and a Received Signal Strength Indicator (RSSI) using the extracted UCQI.

14. The relay method of claim 9, further comprising measuring bi-directional channels qualities between the RS s and optimizing routing between the RSs.

15. A method for optimizing routing in a mobile communication system, the method comprising:

exchanging Link Quality Information (LQI) among nodes within a cell;
configuring a routing table using the exchanged LQI;
measuring bi-directional channels qualities between every pair of nodes and optimizing routing between every pair of nodes;
measuring a quality of a signal received from a Mobile Station (MS);
determining whether to relay data by comparing the measured signal quality with a reference threshold; and
updating a relay path and relaying the data using the updated relay path when a relay response message is received.

16. The method of claim 15, wherein the LQI includes at least one of information regarding paths between at least one of a BS and an RS and the RS and another RS, cost information regarding the paths, the number of paths, and the link qualities of the paths.

17. The method of claim 15, wherein the routing table is configured with a tree structure with a BS on top.

18. The method of claim 15, wherein the nodes perform a Media Access Control (MAC) relay by the optimized routing.

19. A method for relaying data in a mobile communication system, the method comprising:
measuring a quality of a signal received from a Mobile Station (MS), determining whether to relay data received from the MS by comparing the measured signal quality with at least one of information regarding a data rate of the MS and a reference threshold, and transmitting a relay request message to a Base Station (BS) by a Relay Station (RS), if the RS determines to relay the data received from the MS; and
determining whether to accept the relay request, and transmitting a relay response message and broadcasting information to the RS according to the determination by the BS; and
updating a stored relay path using the broadcasting information and relaying the data received from the MS to the BS in the updated relay path.

20. The method of claim 19, wherein the BS determines whether to accept the relay request according to at least one of signal quality received from one of the RS and an MS, an uplink channel status between the BS and the MS, the signals qualities from the BS and the MS, and loads of the BS and the RS by the BS.

21. The method of claim 19, wherein the relay request message includes at least one of an Identifier (ID) of the RS, an ID of the MS, an Uplink Interval Usage Code (UIUC) and a Downlink Interval Usage Code (DIUC).

22. A mobile communication system comprising:
a Relay Station (RS) for measuring a quality of a signal received from a Mobile Station (MS), determining whether to relay data received from the MS by comparing the measured signal quality with at least one of information regarding a data rate of the MS and a reference threshold, and transmitting a relay request message to a Base Station (BS) when the RS determines to relay the data received from the MS; and
the BS for determining whether to accept the relay request, upon receipt of the relay request message from the RS and transmitting a relay response message and broadcasting information to the RS according to the determination.

23. The mobile communication system of claim 22, wherein upon receipt of the broadcasting information from the BS, the RS updates a stored relay path using the broadcasting information and relays the data received from the MS to the BS in the updated relay path.

24. The mobile communication system of claim 22, wherein the BS determines whether to accept the relay request according to at least one of the signal quality received from at least one of the RS and an MS, an uplink channel status between the BS and the MS, the signals qualities from the BS and the MS, and loads of the BS and the RS by the BS.

25. The mobile communication system of claim 22, wherein the relay request message includes at least one of an Identifier (ID) of the RS, an ID of the MS, an Uplink Interval Usage Code (UIUC) and a Downlink Interval Usage Code (DIUC).

26. The mobile communication system of claim 22, wherein the relay response message includes at least one of an ID of the RS, an ID of the MS, a UIUC, a DIUC and a response for the relay request message.

27. A relay method of a Relay Station (RS) and Base Station (BS) in a mobile communication system, the method comprising:
configuring a routing table using Link Quality Information exchanged among RSs in a cell and determining a relay path referring to the routing table;
measuring a quality of a signal received from a Mobile Station (MS);
determining whether to relay data received from the MS by comparing information regarding the measured signal quality with at least one of a data rate of the MS and a reference threshold;
transmitting a relay request message to a Base Station (BS), when the RS determines to relay the data received from the MS;
updating the relay path, relaying the data received from the MS to the BS using the updated relay path when the MS receives a relay response message accepting the relay request and broadcasting information from the BS;
determining whether to accept the relay request, upon receipt of a relay request message from the RS;
transmitting a relay response message including an acceptance for the relay request when the BS accepts the relay request; and
changing the broadcasting information and broadcasting the changed broadcasting information.

28. The relay method of claim 27, wherein the received signal includes at least one of a pilot signal and an uplink Protocol Data Unit (PDU).

29. The relay method of claim 27, wherein the relay request message includes at least one of an Identifier (ID) of the RS, an ID of the MS, an Uplink Interval Usage Code (UIUC) and a Downlink Interval Usage Code (DIUC).

30. The relay method of claim 27, wherein the relay response message includes at least one of an ID of the RS, an ID of the MS, a UIUC, a DIUC and a response for the relay request message.

31. The relay method of claim 27, wherein the measuring of the signal quality comprises:
extracting Uplink Channel Quality Information (UCQI) regarding the MS; and
measuring at least one of a Carrier-to-Interference and Noise Ratio (CINR), and a Received Signal Strength Indicator (RSSI) using the extracted UCQI.

32. The relay method of claim 27, wherein the determining of whether to accept the relay request comprises determining whether to accept the relay request according to at least one of the signal quality received from at least one of the RS and an Mobile Station (MS), an uplink channel status between the BS and the MS, signals qualities from the BS and the MS, and loads of the BS and the RS.

33. The relay method of claim 27, wherein the changed broadcasting information includes at least one of a Downlink-MAP (DL-MAP) message, an Uplink-MAP (UL-MAP) message, an Uplink Channel Descriptor (UCD) message and a Downlink Channel Descriptor (DCD) message, for periodically updating a routing path.

* * * * *